United States Patent
Hassan

(10) Patent No.: US 8,265,020 B2
(45) Date of Patent: Sep. 11, 2012

(54) COGNITIVE ERROR CONTROL CODING FOR CHANNELS WITH MEMORY

(75) Inventor: Amer A. Hassan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 604 days.

(21) Appl. No.: 12/269,319

(22) Filed: Nov. 12, 2008

(65) Prior Publication Data

US 2010/0118795 A1    May 13, 2010

(51) Int. Cl.
*H04W 4/00* (2009.01)
(52) U.S. Cl. .......................... 370/329; 370/338
(58) Field of Classification Search .............. 370/252, 370/329, 338
See application file for complete search history.

(56) References Cited

U.S. PATENT DOCUMENTS

| | | | |
|---|---|---|---|
| 5,396,239 A | 3/1995 | McMahan | |
| 5,828,677 A | 10/1998 | Sayeed | |
| 5,907,563 A | 5/1999 | Takeuchi | |
| 5,940,439 A | 8/1999 | Kleider | |
| 6,377,643 B1 * | 4/2002 | Lee et al. | 375/368 |
| 6,493,836 B2 * | 12/2002 | Olarig et al. | 714/42 |
| 6,631,492 B2 * | 10/2003 | Marchant | 714/764 |
| 6,678,263 B1 | 1/2004 | Hammons, Jr. et al. | |
| 6,883,133 B1 | 4/2005 | Gupta | |
| 7,055,081 B2 * | 5/2006 | Boyer et al. | 714/764 |
| 7,146,553 B2 | 12/2006 | Jarchi | |
| 7,864,471 B2 * | 1/2011 | Sridhara et al. | 360/51 |
| 2005/0182994 A1 * | 8/2005 | Ashikhmin et al. | 714/748 |
| 2005/0262419 A1 | 11/2005 | Becker et al. | |
| 2005/0278169 A1 | 12/2005 | Hardwick | |
| 2006/0248435 A1 * | 11/2006 | Haratsch | 714/784 |
| 2007/0092033 A1 * | 4/2007 | Yu et al. | 375/295 |
| 2007/0113143 A1 * | 5/2007 | Liao et al. | 714/753 |
| 2007/0220409 A1 * | 9/2007 | Shao et al. | 714/795 |
| 2007/0223390 A1 * | 9/2007 | Kobayashi et al. | 370/252 |
| 2007/0248173 A1 | 10/2007 | Hassan et al. | |
| 2008/0090517 A1 * | 4/2008 | Cheng | 455/39 |
| 2009/0193313 A1 * | 7/2009 | Kong et al. | 714/755 |
| 2009/0204874 A9 * | 8/2009 | Lakkis | 714/783 |

FOREIGN PATENT DOCUMENTS

WO   WO 2007/127250   11/2007

OTHER PUBLICATIONS

International Search Report and Written Opinion for International Application No. PCT/US2009/063106 mailed Jun. 17, 2010.

(Continued)

*Primary Examiner* — Chi Pham
*Assistant Examiner* — Farah Faroul

(57) ABSTRACT

Techniques for adapting error control codes (ECCs) based on memory conditions in a channel. A wireless communication system may be adapted to detect and quantify memory in a channel, such as memory resulting from multipath fading, and adjust an ECC to reduce the possibility of errors impacting communication in the channel. In some implementations, adjusting the ECC may comprise determining a probability that a channel in an error-prone state will remain in an error-prone state, and selecting an ECC based on that probability. In other implementations, a concatenated code may be used, and the relative size of an inner and outer code may be adjusted, and/or an interleaver between the inner and outer code may be adjusted, based on the parameter quantifying the memory in the channel.

19 Claims, 13 Drawing Sheets

OTHER PUBLICATIONS

Cygan, D. et al., "A Concatenated Coding Scheme for Error Control," IEEE Transactions on Communications, vol. 43, No. 2/3/4, Feb./Mar./Apr. 1995, p. 795-803, http://ieeexplore.ieee.org/stamp/stamp.jsp?arnumber=1096555&isnumber=24007.

Kanal, L. et al., "Models for Channels with Memory and their Applications to Error Control," Proceedings of the IEEE, vol. 66, No. 7, Jul. 1978, p. 724-744, http://ieeexplore.ieee.org/stamp/stamp.jsp?arnumber=1455282&isnumber=31267.

Kasami, T. et al., "A Concatenated Two-Stage Adaptive (CTSA) Error Control Scheme for Data Transmission in Time-Varying Channels," IEEE Transactions on Communications, vol. COM-34, No. 5, May 1986, p. 481-488, http://ieeexplore.ieee.org/stamp/stamp.jsp?arnumber=380111&isnumber=8633.

Oosthuizen, D.R. et al., "Markov Models for Block Code Error Control Systems on Fading RF Channels," IEEE, COMSIG Jun. 23, 1989, http://ieeexplore.ieee.org/stamp/stamp.jsp?arnumber=00129006.

Sharma, G. et al., "Performance Evaluation of Burst-Error-Correcting Codes on a Gilbert-Elliott Channel," IEEE Transactions on Communications, vol. 46, No. 7, Jul. 1998.

* cited by examiner

COGNITIVE ERROR CONTROL CODING FOR CHANNELS WITH MEMORY

BACKGROUND

Wireless signals associated with inter-computer communication can be disrupted based on conditions of the environment in which they propagate. Obstacles in the environment, such as buildings and mountains can cause disruption. Other signals from other devices and noise from machinery and other sources of electromagnetic interference can also cause disruptions. Signal disruption may result in errors being introduced into the data carried by the signal.

Techniques have been proposed for identifying data corruption and even allowing effective communicate despite data corruption. Error control coding (ECC) is one such technique. In error control coding, prior to transmission data is encoded into symbols according to a selected error control code. Each ECC has its own rules of construction that define valid symbols. Only transmitting data in a signal as a limited set of valid symbols allows a receiver of the signal to identify during decoding that an error occurred when received data does not match a valid symbol. A receiver may then determine with a high likelihood the actual transmitted data by matching the corrupted data to a valid symbol, which can be decoded to output the original data. In one simple ECC rule of construction, a single data bit to be transmitted may be transmitted as three redundant bits: a 0 becomes a 000, and a 1 becomes a 111. When a receiver receives the bits, it can determine whether the received bits define a valid symbol; a 101 would be an invalid symbol according to this example rule of construction. The receiver may then match the invalid symbol to the most similar valid symbol or otherwise determine the symbol that was most likely transmitted given the symbol that was received In this case, the invalid symbol 101 may be matched to the valid symbol 111, and the symbol decoded to a 1.

Error control codes are typically expressed in terms of their error control rate, a fractional number indicating the number of data bits associated with each transmitted bit. The exemplary ECC described above is known as ⅓ ECC: for every 1 data bit, 3 bits are transmitted. If more bits are transmitted for each data bit, the ECC can correct for more errors and the code is said to have a higher error control rate, even though the rate may be expressed as a smaller fraction. The error control rate may also be described as indicative of the "strength" of an ECC, as a stronger ECC (higher error control rate) can correct more errors.

A conventional wireless communication system, comprising a transmitter and receiver, may have one or more preselected error control codes with which it may transmit data. If the system has multiple ECCs available to it, it may switch between these depending on conditions in the channel and based on feedback from the receiver regarding errors that have been detected by the receiver. Because ECCs lower the amount of data transmitted by adding redundant bits to a transmission, typically the "weakest" available ECC—the ECC with the lowest number of redundant bits and, thus, the lowest ability to correct errors—that provides an acceptable level of error correction for the conditions of the environment is selected. As the conditions change and more errors are detected, a stronger available ECC may be selected. The ECCs available to a transmitter are pre-provisioned for a radio, in advance of communication.

In some cases, a concatenated code may be used that combines two separate ECCs. In a concatenated code, data may be encoded using a first ECC, then the encoded data may be encoded again using a second ECC. Interleaving may also be used between the two codes, such that bits from multiple symbols output from the first ECC are divided into new symbols before being encoded into the second ECC.

Depending on the cause of disruption, errors in bits encoded in a signal may appear to be random or may be correlated in some way. If the errors are correlated such that occurrence of an error indicates that, at a later time, another error is likely to occur, the channel is said to have "memory."

Memory may exist for any number of reasons. For example, many environments create a phenomenon known as "multipath fading" at the receiver. When a transmitter broadcasts a signal to a receiver, the signal may arrive at the receiver via multiple paths and at multiple times depending on the length of the path. One of these paths may be a direct path to the receiver, and the signal may arrive at the receiver at a first time. A second path may include reflections off buildings, mountains, atmospheric layers, or other obstacles. The reflected signal may travel a longer distance to the receiver, arriving at a second time. In multi-path fading, the second signal received via the second path may interfere with the first signal received via the first path, causing errors in the first signal. Whether a second signal causes interference depends on the relative positions of the transmitter, receiver, and the obstacles from which signals reflect. When conditions causing interference exists, they are likely to persist for a period of time. During that period, a cluster, or burst, of errors may occur.

SUMMARY

Applicant has recognized and appreciated that in many computing environments improvements may be made in conventional error control coding approaches of adapting an error control rate based on detected errors. Rather, computers may select an error control code used in a channel based on sensing memory in the channel. In some embodiments, the selection may be between different error control codes, some of which provide a higher probability of communication in a channel with memory.

In other embodiments, error control coding may be based on a concatenated code, having at least an inner code and an outer code. In some such embodiments, an error control code may be selected by altering the relative error control rate between the inner and outer code. Applicant has recognized and appreciated that a receiver has a higher probability of outputting a correct symbol when the outer code receives an input symbol stream in which symbols containing errors are "erased" rather than when the same symbol stream is processed with those symbols containing errors. As a result, the inner error control code rate is selected to reliably detect symbols with errors during a burst of errors, even though it may not be able to correct symbols with multiple errors. If the inner code cannot correct the errors in a symbol, the symbol is erased. Because a lower rate is required to detect, as opposed to correct, errors, a higher error control rate can be used in outer codes. In addition, the outer code can more likely determine a valid symbol if its input stream includes erasures rather than incorrect bits (i.e., errors), resulting in a higher probability of accurate communication for a given composite error control rate of the concatenated code.

Such an approach for selecting an error control may be embodied in a personal computer system configured to detect memory in a communication channel for communicating between two personal computing devices. The computer system may ten select an error control code appropriate for the memory in the channel and may adapt a radio for communication according to the selected error control code. In some embodiments, the radio may be a software defined radio, which can be reprogrammed for an error control code selected based on a parameter indicating memory in the channel.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
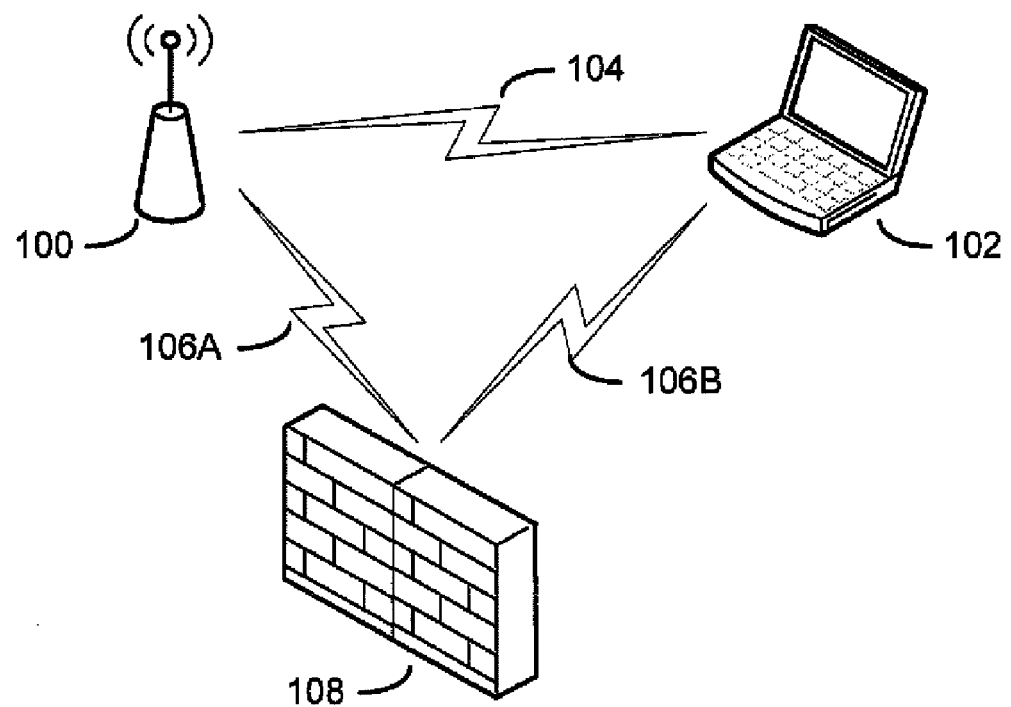
FIG. 1 illustrates an exemplary multipath fading environment in which techniques operating according to some of the principles described herein may act.

Conventionally, error control codes (ECCs) are selected by a wireless communication system based on errors detected by a receiver in the system. When a receiver detects that the number of errors affecting signals communicated by the system is rising, then the receiver may inform the transmitter in the system that a stronger ECC is necessary to detect and/or correct the increased errors. A weaker ECC later may be selected by the system when the number of errors is reduced.

Applicant has recognized and appreciated that improved communication is possible by detecting whether a channel has memory, and selecting an ECC for a channel based on memory conditions. In one implementation, a transmitter and/or receiver may sense at least one parameter of a channel that may be indicative of memory in the channel. An ECC may be selected for a signal to be transmitted in the channel based on whether the channel has memory and/or the strength of the memory in the channel.

In some implementations, a concatenated code may be used to detect and correct errors in a channel with memory. The parameters of the concatenated code may be set according to the strength of the memory in the channel. For example, a concatenated code may comprise an inner code that is well-adapted to correcting memory errors and an outer code that is well-adapted to detecting random errors. If a particular error control rate is desired for a signal, two ECCs may be selected for the inner and outer codes that together meet that overall error control rate.

The two ECCs may be respectively selected based on memory in the channel. If a channel has a significant amount of memory, then the codes may be chosen such that the outer code is stronger than the inner code. By selecting a weak inner code, the outer code may be made stronger while maintaining the desired overall information rate. In some cases where a channel has memory, an inner code may be selected that is strong enough to detect errors during a burst, but not strong enough to correct the errors. Instead, a symbol with a detected error may be output by the inner ECC as an erasure, or null bits. The erasures may be combined with bits of valid symbols output by the inner code such that the erasures are distributed over the symbols provided to the outer code for decoding, rather than concentrated in one symbol or a small number of symbols. The stronger outer code may then be used to correct the errors, including the errors indicated by the erasure.

In view of the foregoing, described herein are various principles that may be used in wireless communication systems exchanging information between personal computing devices for detecting whether a channel in which a signal is being communicated has memory. This may be detected in any of various ways, including by measuring at least one characteristic of a channel and/or a signal transmitted or received over the channel, and deriving a parameter that indicates whether the channel has memory. If a channel has memory, then an ECC may be selected on the basis of that memory and a radio may be configured to operate according to the selected ECC.

Additional functions and advantages of these and other techniques operating in accordance with the principles described herein will be more fully understood from the examples described below. The following examples are intended to facilitate an understanding of the invention and to illustrate the benefits of the principles described herein, but do not exemplify the full scope of embodiments of the invention.

Techniques operating according to any of the principles described herein can operate in many different wireless communication systems that provide for communication to or from personal computing devices. For example, these techniques may be implemented for communications in Wireless Local Area Networks (WLANs), Wireless Personal Area Networks (WPANS), Wireless Wide Area Networks (WWANs), and Wireless Regional Area Networks (WRANs), among others. In such wireless communications systems, two personal computing devices may communicate directly with one another, or a personal computing device may communicate with a networking component such as a wireless access point. As used herein, a personal computing device may be any computing device having a user interface by which a user can interact with the computing device. Exemplary personal computing devices include laptop and desktop personal computers, personal digital assistants (PDAs), and smart mobile phones.

FIG. 1 shows one exemplary computing system in which some techniques operating according to the principles described herein may act. It should be appreciated, however, that FIG. 1 is merely illustrative of the various systems that may implement these techniques, and that others are possible.

FIG. 1 shows a wireless communication system comprising a wireless access point 100 and a personal computing device 102, shown in FIG. 1 as a laptop personal computer. The wireless access point 100 and personal computing device 102 are in wireless communication with one another, and are using at least one error control code (ECC) to detect and correct errors that are introduced into the signals by the conditions of the environment of the wireless communication system. The wireless access point 100, when transmitting data on a signal to the personal computing device 102, may select an ECC, inform the personal computing device 102 of the selection in any suitable manner, and then transmit data to the personal computing device 102 using the ECC. The personal computing device 102 may then decode the received signal using the ECC, and use the data contained therein in any suitable way.

Figure 2:
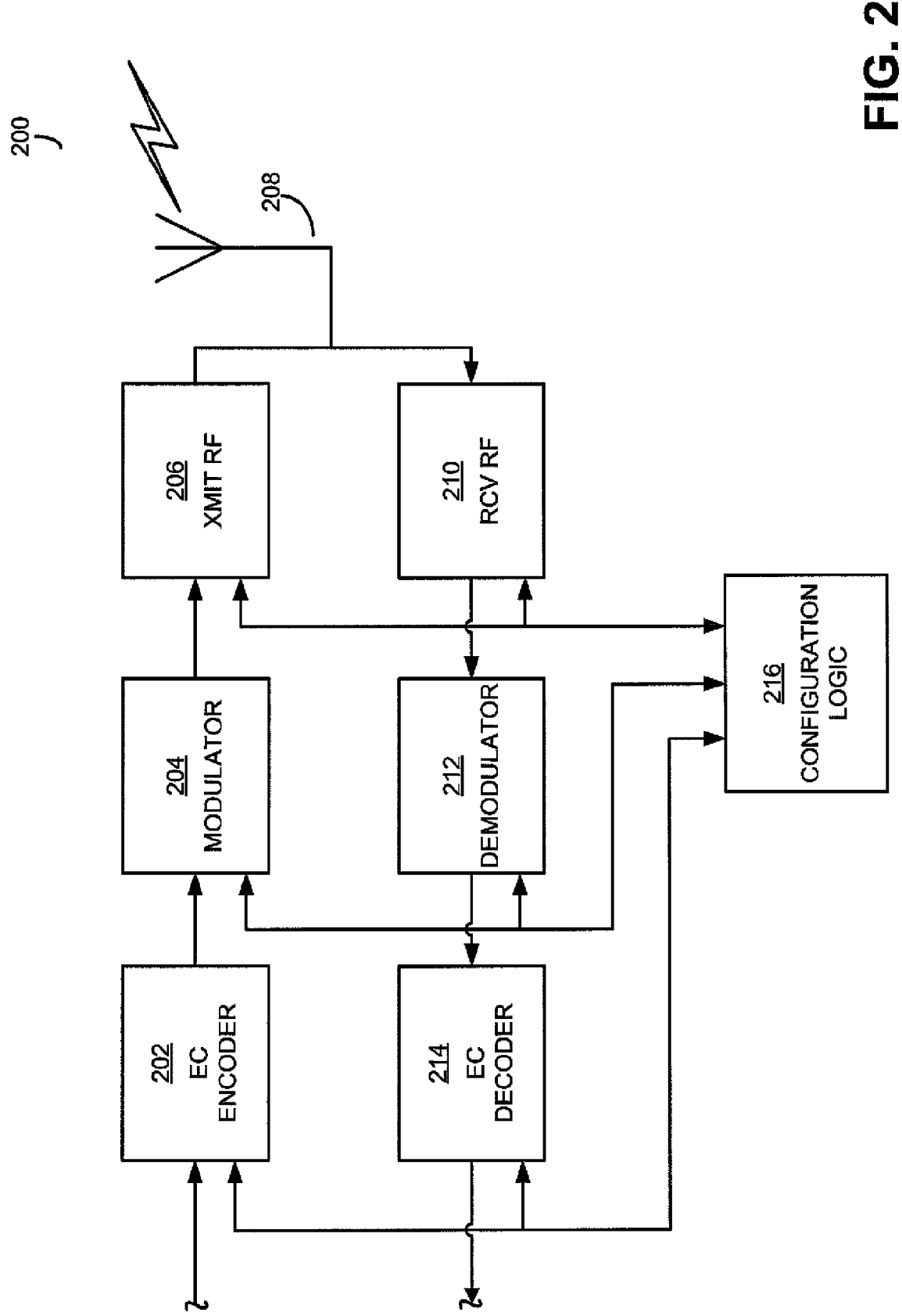
FIG. 2 is a block diagram of components of a first exemplary radio system that may be implemented by a computing device.

FIG. 2 shows a block diagram of some of the components of a wireless radio 200 system that may be implemented in a personal computing device implementing techniques described herein. The radio 200 comprises two tracks by which information may be transmitted or received by the radio 200. The upper track of FIG. 2 is the transmitter track. The transmitter track comprises an error control encoder 202 that receives data and outputs valid symbols according to the rules of construction for the selected ECC. The symbols output by the EC encoder 202 may be modulated into a signal by modulator 204 and output by the radio frequency transmitter 206 on the antenna 208.

The lower track of FIG. 2 is the receive track. The receive track comprises a radio frequency receiver 210 which receives signals from the antenna 208 and passes them to a demodulator 212, which extracts symbols from the received signal. The symbols extracted by the demodulator 212 are passed to the error control decoder 214, which attempts to match the symbols to valid symbols according to the rules of construction for the selected ECC.

If the symbols output by demodulator 212 are valid symbols, then these valid symbols may be matched to corresponding data and the data output by the EC decoder 214. If the symbols output by demodulator 212 are invalid symbols, the EC encoder 214 may nonetheless these invalid symbols to valid symbols provided that the invalid symbols do not contain more errors than can be corrected by the ECC used by EC decoder 214. Once a valid symbol is identified, it may be matched to corresponding data, and the data may be output by EC decoder 214.

Each of the components of the radio 200 may be controlled by configuration logic 216, which may control the components to vary the configuration of the radio 200. For example, configuration logic 216 may control the EC encoder 202 and EC decoder 214 to switch the ECC by which they operate between different ECCs. The varied ECCs may be ECCs that were pre-provisioned for the radio 200, or may, in some implementations, be an entirely new ECC. An entirely new ECC may be used in the case where the radio 200 is a fully-configurable radio, such as a software-defined radio (SDR). Pre-provisioned ECCs may be used in SDRs and may also be used in radios that are wholly or partially implemented in hardware.

Selection of an ECC by configuration logic 216 may be done in any suitable manner and prompted by any suitable condition. Returning to FIG. 1, in addition to transmitting and receiving data to and from the wireless access point 100, the computing device 102 may also communicate to the wireless access point 100 any suitable information about the received signal. For example, the information about the signal may comprise information about a number of detected errors and/or an indication of whether the channel in which the signal is being transmitted has memory. This information may be used by the wireless access point 100 as feedback on the ability of the currently-selected ECC to correct errors introduced by conditions in the channel. In accordance with some of the principles described herein, an ECC may be selected based at least in part on whether the channel has memory and the strength of that memory.

A channel may have memory as a result of various phenomena, including multipath fading. FIG. 1 shows one exemplary cause of multipath fading. When a signal is transmitted from the wireless access point 100 to the personal computing device 102, the signal may travel along a first path 104 directly toward the personal computing device 102 and arrive at a first time. The signal may also travel along a first portion 106A of a second path toward obstacle 108, and be reflected toward the personal computing device 102 via a second portion 106B of the second path, arriving at the personal computing device 102 at a second time later than the first time. When the signal arrives at the second time via the second path, it may interfere with the signal being received by the first path. The interference may persist for as long as wireless access point 100, personal computing device 102, and obstacle 108 remain in the same relative position. Accordingly, if multipath fading causes one error, it is likely to cause a high rate of errors for as long as the multipath fading exists. This clustering of errors is an indication of memory in the channel between access point 100 and personal computing device 102. The likelihood that errors will continue to occur at a high rate is an indication of the strength of the memory.

Figure 3:
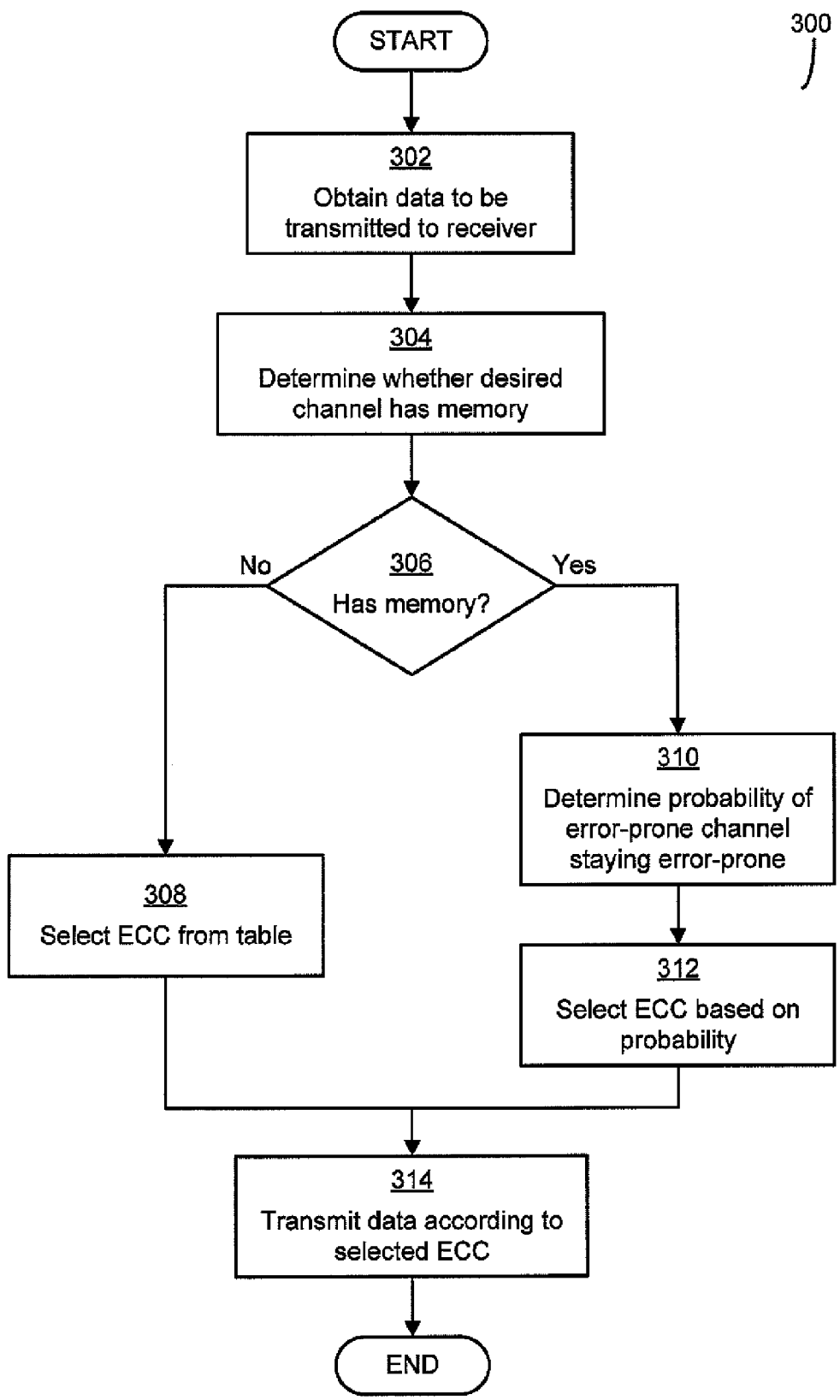
FIG. 3 is a flowchart of an exemplary process for selecting an error control code to use for a transmission, that may be implemented in accordance with some of the principles described herein.

FIG. 3 shows an example of an ECC selection process 300 that may be used to select an ECC for communications in a channel based at least in part on whether the channel has memory. In some embodiments, the selection may be based in part on the strength of the memory. It should be appreciated, however, that the process 300 is merely illustrative of the types of processes that may be implemented in accordance with the principles described herein, and that others are possible.

Process 300 begins in block 302, in which a transmitter obtains data to be transmitted to a receiver. This may be done in any suitable manner, such as by an application on a personal computing device supplying the data to a transmitter associated with the personal computing device. In block 304, the transmitter selects a channel in which to transmit the data and determines whether the desired channel has memory. The determination of block 304 may be performed in any suitable manner. For example, the transmitter may have previously transmitted to the receiver over the channel, and may have stored feedback from the receiver relating to the channel conditions. The feedback may indicate whether the channel has memory, and the transmitter may consult the feedback to determine whether the channel has memory. As another example, the transmitter may transmit a test packet to the receiver and receive a response from the receiver indicating whether the channel has memory. Any other suitable technique may be used to determine whether a channel has memory.

In block 306, if the channel does not have memory, then a conventional ECC selection process may be carried out. In block 308, an ECC may be selected from a table of ECCs depending on a desired information rate. The table of ECCs may be any suitable table, including any of the known tables of ECCs and information rates. Once an ECC is selected in block 308, then that ECC may be used in block 314 to transmit the data obtained in block 302 to a receiver, and the process 300 ends.

If, however, it is determined in block 306 that the channel does have memory, in block 310 the strength of the memory is estimated by determining the probability that an error-prone channel will stay error prone. This probability is described in greater detail below in connection with FIGS. 4 and 5. The determination of block 310 may be made in any suitable manner. For example, as in block 304, the determination may be made by consulting feedback information from the receiver that is stored by the transmitter. The receiver may have made the determination in any suitable manner, including by any of the examples described below. In block 312, an ECC is selected based on the probability calculated in block 310, then that ECC may be used in block 314 to transmit data to a receiver, and the process 300 ends.

It should be appreciated that while the process 300 of FIG. 3 was described as being carried out by a transmitter, in some implementations a process similar to that shown in FIG. 3 may be carried out by a receiver. A receiver may monitor a channel and make determinations regarding memory in the channel and the strength of that memory, then select an ECC and inform the transmitter of the selection. In other embodiments, the combined action of a transmitter and receiver (or, more generally, the combined action of any number of endpoints) may be used to select an ECC.

A channel with memory may be modeled as being in one of two states of a Markovian state machine. A Markovian process is a mathematical model in which the next state of a state machine depends only on the current state at a given time and not on any past states. Two states are shown in the Markovian state machine shown in FIG. 4: a good state G and a bad state B. A "good state" in the context of wireless communication is one in which errors are infrequent, such that communication can still take place. In a good state, the errors can generally be corrected. A "bad state" in this context is one in which errors become more frequent, such as may be caused by a fade. It may still be possible to correct errors in a bad state, so that communication may continue, but a stronger ECC may be needed.

Figure 4:
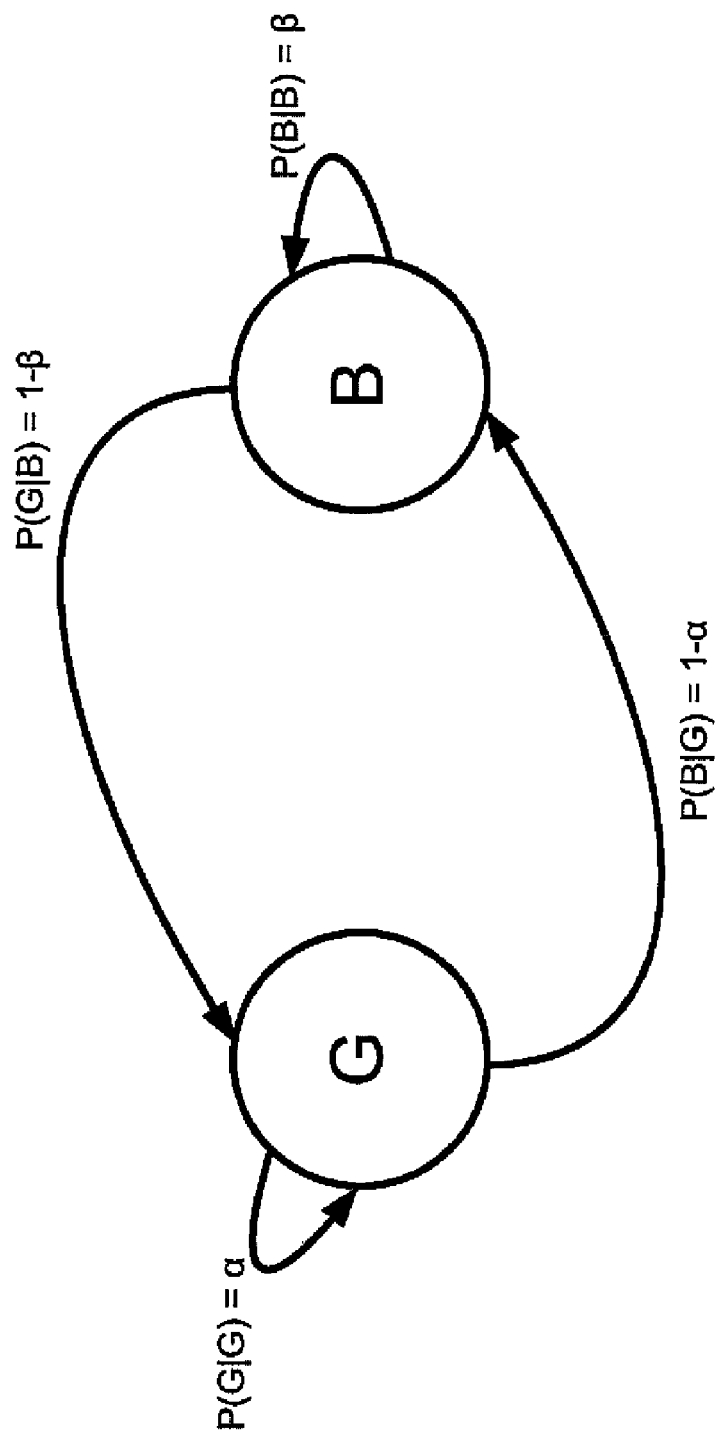
FIG. 4 is a diagram of a Markovian state machine that may be used to model the properties of a channel having memory.

In accordance with the Markov model, a channel that is in one of the two states has a probability of staying in that state and a probability of moving to the other state. In FIG. 4, this is shown with arrows looping back to the states and arrows directed to the other state. As shown in FIG. 4, the probability that a channel that is in a good state will remain in a good state (P(G|G)) is α, and the probability that a channel that is in a good state will move to a bad state (P(G|B)) is 1-α. Likewise, the probability that a channel that is in a bad state will remain in a bad state (P(B|B)) is β, and the probability that a channel that is in a bad state will move to a good state (P(G|B)) is 1-β.

Determining these probabilities may provide an estimation of the strength of memory in the channel, and an indication of an ECC that will be effective in correcting the errors of the channel. These probabilities may be determined in any suitable manner. In one exemplary technique, the probabilities may be calculated by measuring a power of a received signal over time and comparing the power to a threshold power indicative of good communication. The threshold power may be determined in any suitable manner, such as by selecting a power level indicative of a fade in a multipath fading environment.

Figure 5:
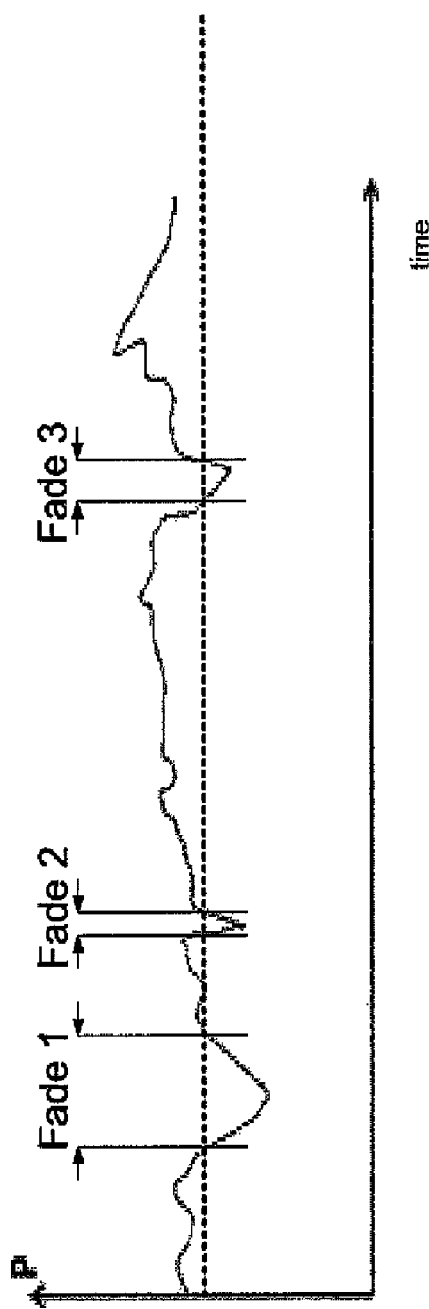
FIG. 5 is a graph of received signal power over time that illustrates an approach that may be used in some implementations to determine whether a channel has memory.
Figure 6:
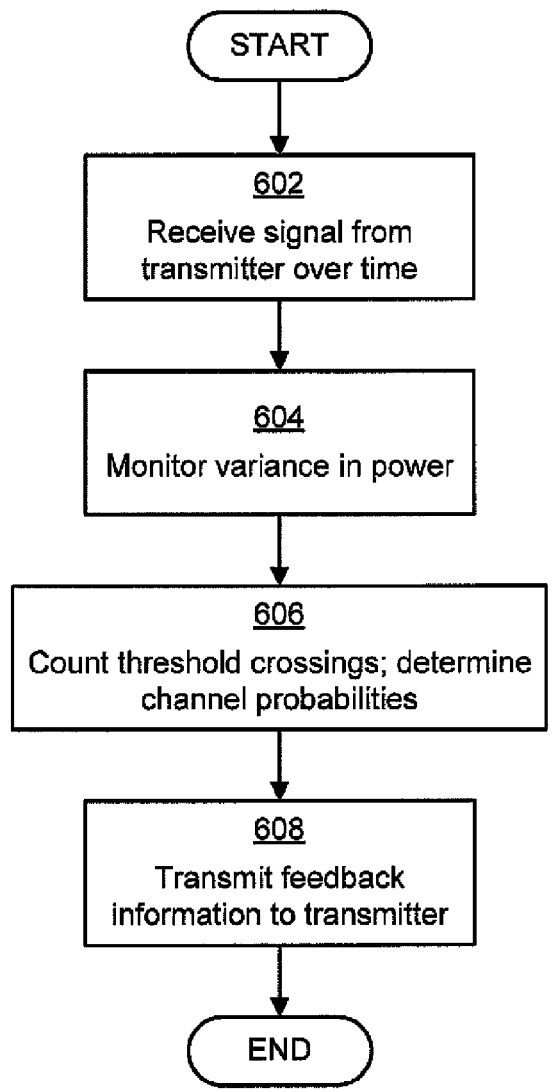
FIG. 6 is a flowchart of an exemplary process for determining a parameter indicative of memory in a channel by monitoring received signal power, that may be implemented in accordance with some of the principles described herein.

FIG. 5 shows a graph of a power level of a received signal over time, with three fades marked. In each fade, the power of the received signal drops below the marked threshold power value, shown in FIG. 5 as a dotted line. As shown in FIG. 5, the signal is in a "good" state primarily, but does enter a "bad" state during the three fades. The probability that the channel in a bad state will stay in the bad state may be calculated by comparing received power levels over time to a threshold. FIG. 6 shows one exemplary process for calculating this probability. It should be appreciated, however, that the process 600 shown in FIG. 6 is merely illustrative of the types of processes that may be carried out to make such a calculation, and that any suitable process may be used.

The process 600 begins in block 602, in which a signal is received from a transmitter over time. In block 604, the power of the received signal is monitored, including whether the signal experiences any fades. In block 606, the variations in the power level are used to calculate the probability that a channel in a bad state will remain in a bad state, and any other probabilities for the channel. In block 606, the number of times the power level of the received signal crosses the threshold power level—i.e., the number of times a bad state becomes a good state—is counted. In some implementations, the calculations of block 606 may further comprise analyzing an amount of time spent in each state within a certain interval of time, such as by performing an integration of the time spent in each state. From this information about the power level of the received signal, the probabilities may be computed in any suitable manner. For example, the probability of staying in a bad state may be estimated by calculating the amount of time spent in the bad state over the time interval divided by the number of transitions from the bad state to the good state. An analogous technique may be used to compute the probability of staying in a good state, if both probabilities are used. Other techniques for calculating these probabilities are discussed in the article "Performance Evaluation of Burst-Error-Correcting Codes on a Gilbert-Elliot Channel," by Gaurav Sharma et al., which appeared in the Institute of Electrical and Electronics Engineers' *Transactions on Communications* in July, 1998, which is incorporated herein in its entirety for its discussion of calculating probabilities.

In block 608, these probabilities and any other suitable information about the received signal may be transmitted to the transmitter as feedback information, and the process 600 ends. This information may then be used, as described above in connection with FIG. 3, to select an ECC with which to transmit information. In some implementations, this feedback information determined by process 600 may be continuously tracked, updated, and sent to the transmitter, such that the ECC may be continually updated according to conditions in the channel. In other implementations, however, the feedback information may be collected at regular time intervals or at any other suitable time on occurrence of any other suitable condition.

It should be appreciated, however, that in some implementations the receiver carrying out the process 600 may select an ECC based on the information about the signal and pass an indication of the selection to the transmitter as an alternative to or in addition to the feedback information transmitted in block 608.

Selection of an ECC based on this feedback information may be carried out in any suitable manner. In some implementations, a type of ECC may be selected based on the probability of staying in a bad state or any other indication of the strength of memory in the channel. For example, a selection may be made between ECCs that are adapted to correct random errors—random-error-correcting codes (RECs) such as the Golay code—and ECCs that are adapted to correct memory errors—burst-error-correcting codes such as the burst error correction code (BEC).

Selection of an REC or a BEC may be made in any suitable manner. For example, a code that is effective for the amount of memory sensed in the channel may be selected. In some embodiments, a communication system may be adapted to implement any one of a set of ECCs. These codes may be characterized based on the channel memory conditions for which each code is the most effective of the set. Once the channel memory is sensed, the most effective code may be selected from the set.

Figure 7:
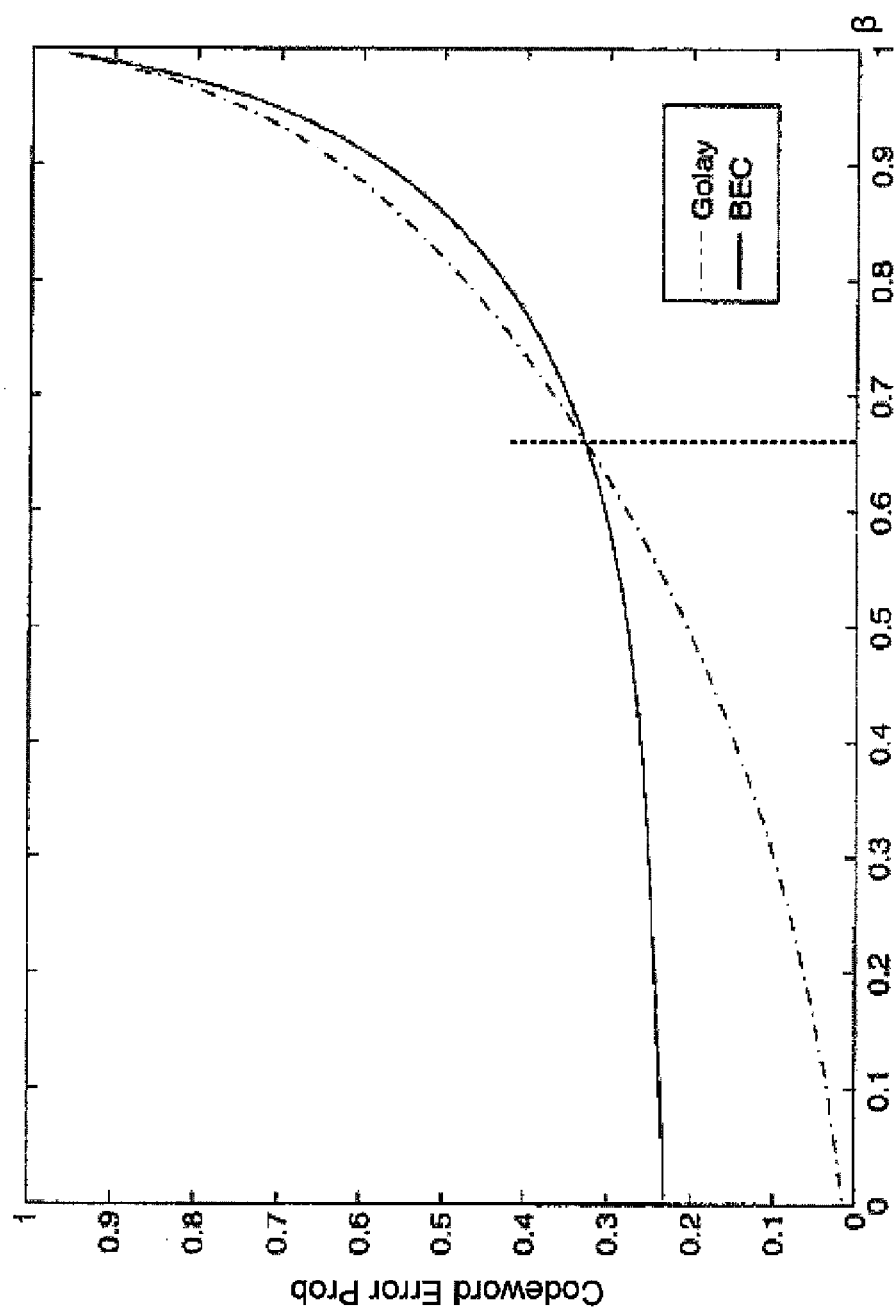
FIG. 7 is a graph of the effectiveness of two different error control codes at detecting and correcting errors based on varying probabilities of a channel that is error-prone staying error-prone over time.

FIG. 7 shows a comparison of an REC, the Golay code, and the BEC, two codes that may be in a set of ECCs. In the graph of FIG. 7, the successes of the two codes are plotted in terms of $\beta$, the probability that a channel in a bad state stays in a bad state, and the codeword error probability, which is the probability of a symbol (codeword) received by a receiver not being mapped to a correct, valid symbol by the ECC. As shown in the graph of FIG. 7, the Golay code has a much lower probability of not correcting errors (i.e., a much higher probability of correcting errors) than the BEC for low values of $\beta$. Starting at approximately $\beta=0.67$, however, the BEC has a lower probability of not correcting errors (i.e., a higher probability of correcting errors).

Accordingly, in one exemplary process for selecting an ECC based on feedback information regarding memory in a channel, if the sensed value of $\beta$ is less than 0.67 the Golay code may be selected. Conversely, if the sensed value of $\beta$ is greater than or equal to 0.67, the BEC may be selected.

Figure 8:
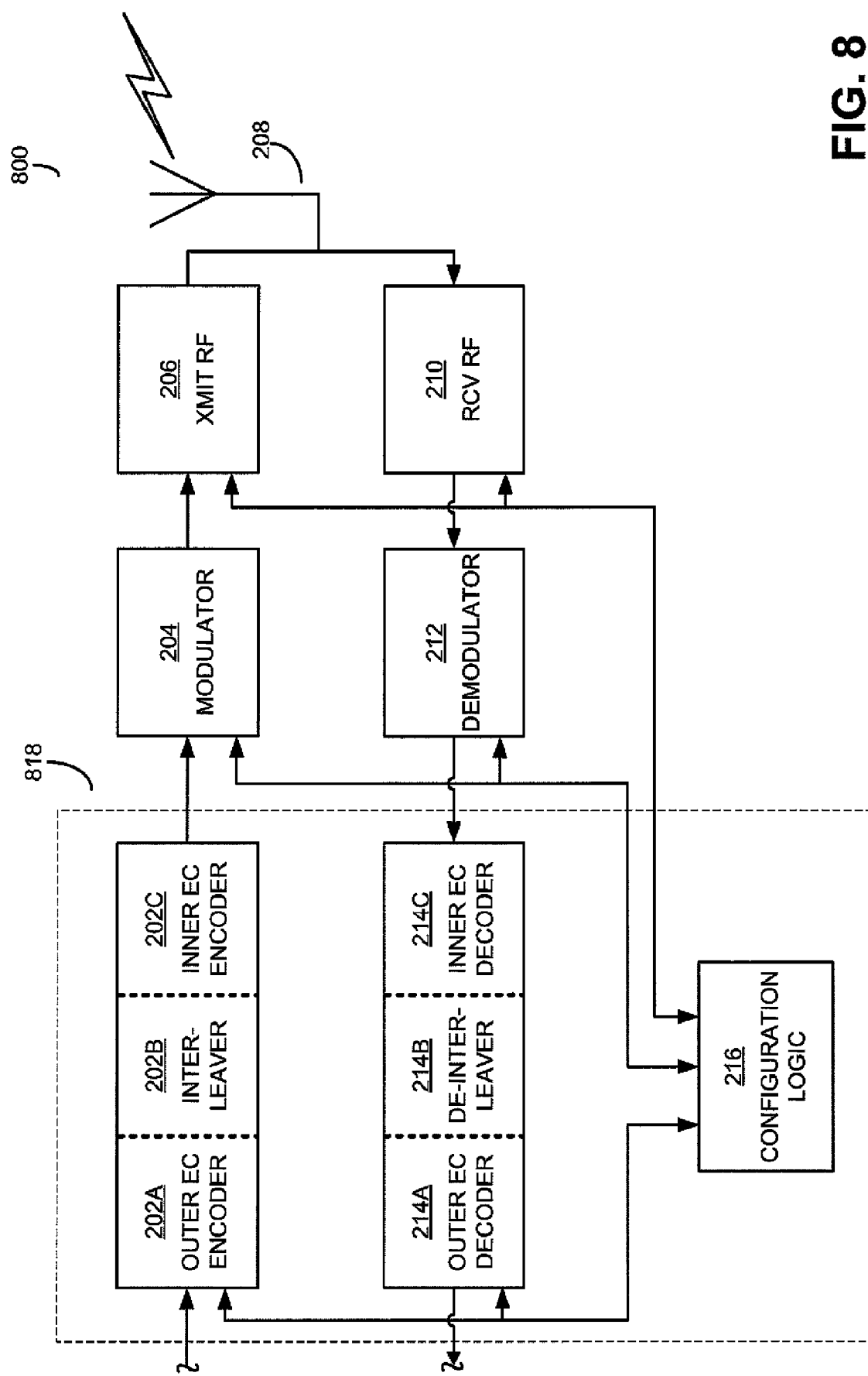
FIG. 8 is a block diagram of components of a second exemplary radio system that may be implemented by a computing device.

As discussed above, some implementations of techniques that select an ECC based on memory conditions in a channel may use a concatenated ECC to encode data. In a concatenated code, two ECCs are used to transmit data, with the encoded symbols of a first code being re-encoded using a second code. FIG. 8 shows a block diagram of a radio 800 that may be used to transmit and receive data using a concatenated code. Many of the components of radio 800 are similar to those discussed above in connection with radio 200 of FIG. 2. Accordingly, these components will not be discussed further.

Radio 800 differs from radio 200, however, in its implementation of an EC encoder 202 and EC decoder 214. Instead, radio 800 comprises an outer EC encoder 202A, an interleaver 202B, and an inner EC encoder 202C. When data is received by the radio 800 to be transmitted to a receiver, it may be first encoded by the outer EC encoder 202A into valid symbols of an outer ECC, according to the rules of construction of the outer ECC. The symbols output by the outer ECC may then be interleaved by interleaver 202B, such that bits of each of the symbols are divided into new groups of bits. For example, in some implementations that interleaver may act by inserting the valid symbols row-by-row into an array, and extracting data column-by-column, though any suitable interleaving process may be implemented.

Figure 9:
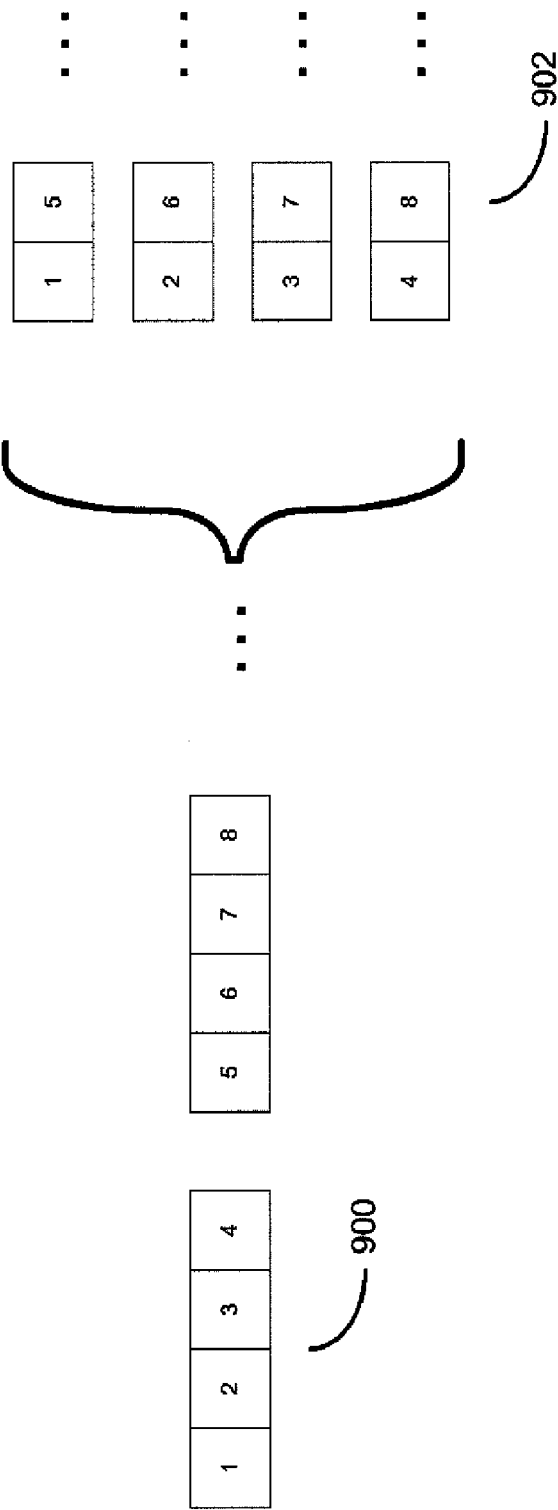
FIG. 9 is an illustration of an exemplary interleaving process that may be carried out in some implementations of techniques operating in accordance with some of the principles described herein.

FIG. 9 shows one exemplary interleaving process, in which bits 900 of input symbols are interleaved to form new symbols with bits 902. The interleaved symbols may then be encoded using the inner EC encoder 202C using a second ECC (the inner ECC). The inner ECC encoder 202C may output valid symbols according to the rules of construction of the inner ECC, and these symbols may be provided to the modulator 204 and radio frequency (RF) transmitter 206 for transmission using the antenna 208. Substantially the same process may be carried out when receiving data, with symbols received by the inner EC decoder 214C being decoded into data corresponding to valid symbols of the inner ECC. The data may then be de-interleaved by de-interleaver 214B into symbols to be input to the outer ECC. The outer EC decoder 214A may then decode the symbols into data corresponding to the received symbols.

Figure 10:
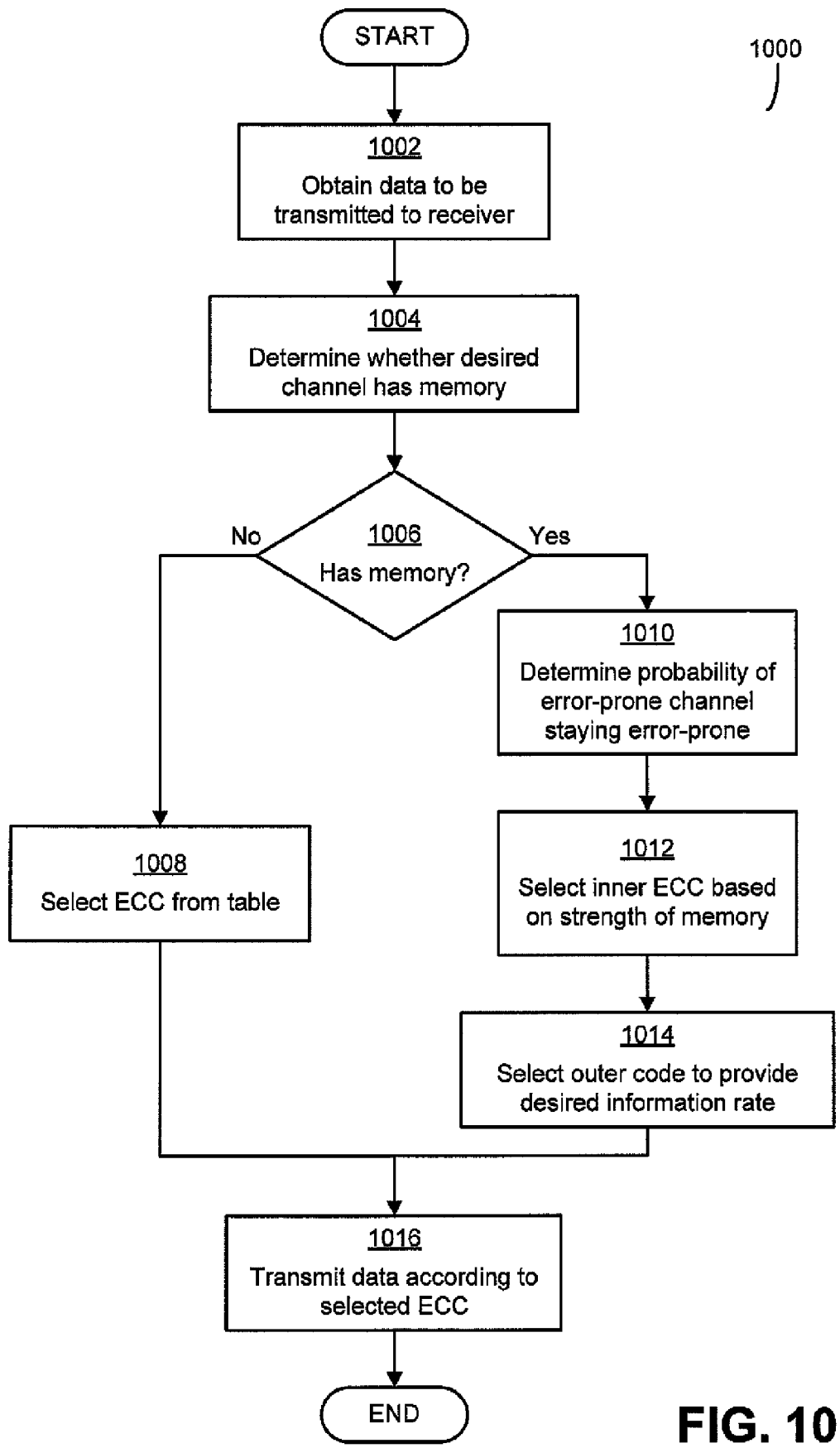
FIG. 10 is a flowchart of an exemplary process for selecting a concatenated error control code to use for a transmission, that may be implemented in accordance with some of the principles described herein.

Selection of the inner ECC and outer ECC of a concatenated code may be carried out in any suitable manner. FIG. 10 shows one exemplary process that may be used to select ECCs, though it should be appreciated that process 1000 is only illustrative of the various techniques that may be implemented for selecting ECCs. For example, while process 1000 is described as being performed by a transmitter, as above, these techniques may be performed by a receiver or by any other suitable component of a wireless communication system.

Process 1000 begins in block 1002, in which a transmitter obtains data to be transmitted to a receiver. In block 1004, the transmitter determines whether the channel has memory. This may be done in any suitable manner, including by any of the exemplary techniques described above in connection with block 304 of FIG. 3. If it is determined in block 1006 that the channel does not have memory, then in block 1008 an ECC is selected from a table as in block 308 of FIG. 3, and data is transmitted according to the selected ECC in block 1016.

If, however, it is determined in block 1006 that the channel has memory, then ECCs may be selected based on a parameter indicating an amount of memory. In this example, the parameter $\beta$ is used. In block 1010 the probability of an error-prone channel staying error prone—i.e., the probability of a channel in a bad state staying in a bad state, $P(B|B)=\beta$—is determined. This may be carried out in any suitable manner, including by any of the techniques described above. In block 1012, an inner ECC is selected based at least in part on the strength of the memory in the channel, as indicated by $\beta$. For a channel with stronger memory, an ECC that is more effective at detecting burst errors may be selected. Further, the outer ECC, in some implementations, may be an ECC that is adapted to detect and correct errors associated with memory, such as the BEC. The selection in block 1012 may be carried out in any suitable manner, including by selecting an inner ECC from a table of available ECCs or by designing an ECC to meet the conditions of the channel, as described above in connection with radio 200 of FIG. 2.

In block 1014, an outer code is selected to provide a desired information rate for the overall concatenated code. As discussed above, the error control rate for an ECC is a measure of the throughput of the code. The error control rate is expressed in a fractional form corresponding to the number of data bits k corresponding to a number of transmitted bits n. A rate r=k/n. For a concatenated code, the overall error control rate is the product of the rates of the inner and outer ECCs:

$$r = r_1 \cdot r_2 = \frac{k_1}{n_1} \cdot \frac{k_2}{n_2} \quad (1)$$

where $r_1$ is the rate for the inner code and $r_2$ is the rate for the outer code. Having selected a code with a particular error control rate for the outer code in block 1012, an outer code may be selected to provide a desired error control rate and thus a desired data throughput. To provide a simplified example, if the desired throughput is ½ and the selected inner code provides an error control rate of ⅔, then an outer code may be selected that has an error control rate of ¾ (½=⅔, x=¾).

The outer code may be selected in block 1014 in any suitable manner. In some implementations, the outer code may be developed to correspond to the desired rate for the outer code, while in alternative implementations an outer code may be selected from a table of available outer codes that has a rate closest to the desired rate. In some implementations an outer ECC may be a rate adapted to detect and correct random errors—complementing the inner code's ability to correct memory errors—while in other implementations any suitable ECC may be selected.

Once a concatenated code is selected by selecting both an inner and outer code, then in block 1016 the data obtained in block 1002 is transmitted using the selected ECC and the process ends.

In some implementations, constraints may be placed on the selection of the inner and outer ECC. For example, the selected codes may be constrained to be one of various pre-provisioned codes available to a radio 800 for selection, and a desired rate may be constrained to being a valid rate given the available codes. As another example, the ECCs may be constrained by a desired error control rate. Bits may be allocated to one or the other ECC for error detection and correction, and the two codes may compete for strength, such that as one is made stronger the other is made weaker.

As another example, in some implementations the error control rate of an inner or outer ECC may be constrained to allow both to detect and correct errors in addition to the other. In other implementations, however, the outer ECC may be made as strong as possible through allocating as many bits to the outer code as can be allocated while still leaving enough bits to the inner ECC to detect, but not necessarily correct, errors in received symbols during a burst of errors. It should be appreciated that detection of errors in a received symbol requires fewer bits than correcting the error.

In some such implementations where the inner ECC is adapted only to detect burst errors, the inner EC decoder 214C of radio 800 may be adapted to introduce erasures into a received symbol when decoding received data. When more errors occur in a received symbol than can be corrected by the inner ECC, the entire symbol may be declared invalid and blanked. These bits are then spread out between various symbols of the outer ECC during the de-interleaving process of de-interleaver 214B. As a result, the blanked bits are dispersed throughout the symbols to be input into the outer ECC. Because the outer ECC may be relatively strong, these errors may be corrected by the outer ECC.

Figure 11:
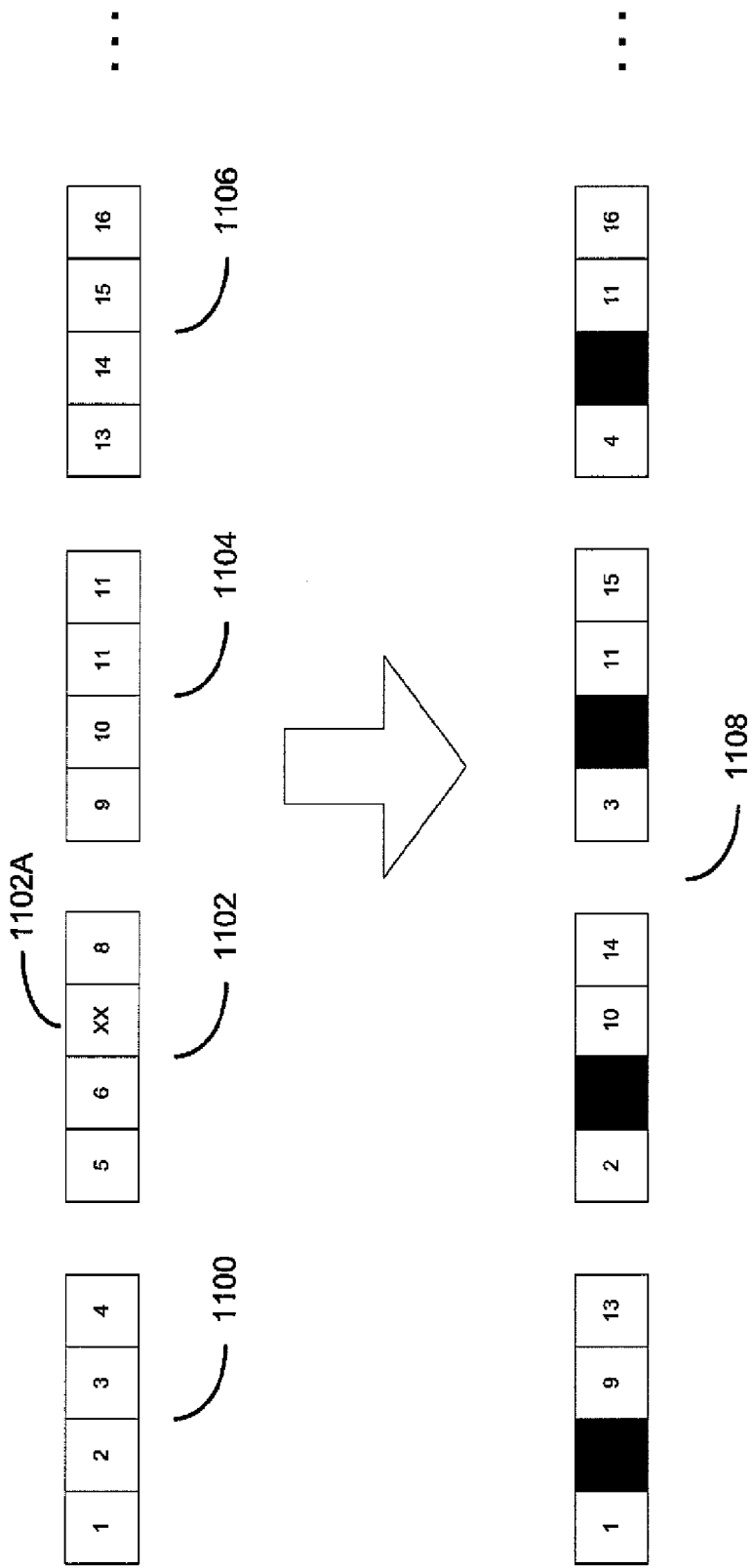
FIG. 11 is an illustration of an exemplary process of de-interleaving and decoding that may be used by techniques using concatenated ECCs in accordance with some of the principles described herein.

This process is shown in FIG. 11. In FIG. 11, demodulator 212 of radio 800 provides the inner EC decoder 214C with symbols 1100, 1102, 1104, and 1106. Symbols 1100, 1104, and 1106 are valid symbols of the inner ECC. Symbol 1102, however, includes at least one error bit 1102A that cannot be corrected by the inner ECC. Because the inner ECC is too weak to permit error correction, the entire symbol 1102 may be blanked by the inner EC decoder 214C and replaced with unknown values. When the symbols are de-interleaved by de-interleaver 214B into symbols 1108, each of the symbols includes an erasure (i.e., an unknown), shown as a black box corresponding to each of the bits of symbol 1102. These symbols 1108 may then be input to the outer EC decoder 214A to be decoded.

Because errors have been identified and extracted by the inner EC decoder 214C and replaced with erasures, the outer EC decoder 214A only has to correct erasures when matching invalid symbols to valid symbols. A property of ECCs is that for every one error the ECC is able to correct, the same ECC may correct for two erasures in known locations. Accordingly, by eliminating the errors using the inner ECC and replacing them with erasures, the outer ECC is able to match more invalid symbols to valid symbols and decode the corresponding data. Because for a given combined error rate, the outer ECC is made stronger as a result of weakening the inner ECC, this advantage improves further as more erasures can be corrected using a stronger outer ECC.

Figure 12:
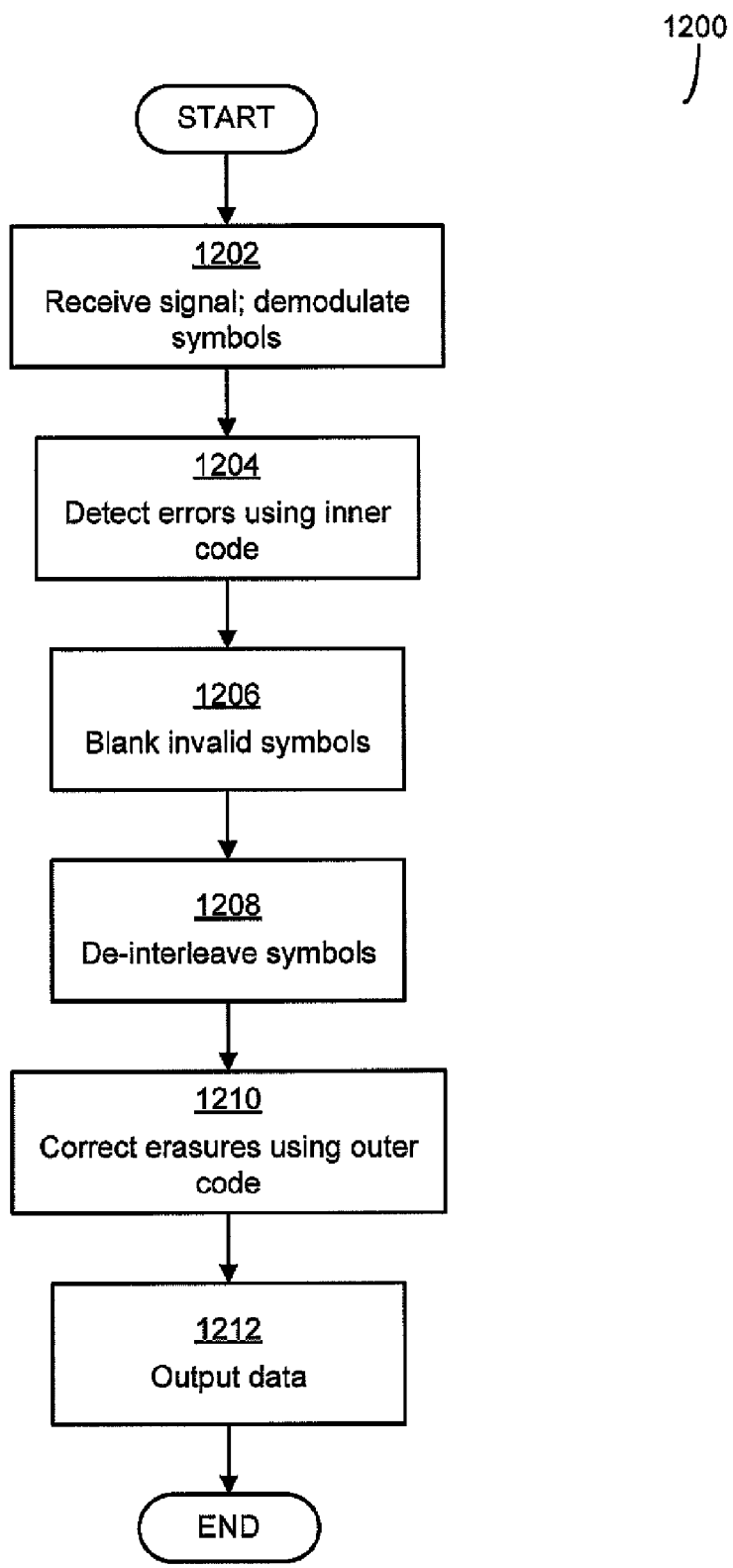
FIG. 12 is a flowchart of an exemplary process for receiving data using a concatenated code, that may be implemented in accordance with some of the principles described herein.

This process is illustrated as process 1200 of FIG. 12. It should be appreciated, however, that this process is merely exemplary of the various processes that may be implemented to correct errors using erasures and a concatenated code. Further, it should be appreciated that embodiments of the invention are not limited to using a concatenated code nor are all embodiments that use a concatenated code limited to using erasures to correct errors. Embodiments of the invention may implement any suitable technique for decoding received data.

Process 1200 begins in block 1202, in which a signal is received by a receiver and demodulated into symbols. In block 1204, the symbols are passed through the inner ECC, and errors are detected using the inner ECC by finding any invalid symbols that do not conform to the rules of construction for the inner ECC. In block 1206, any invalid symbols that contain a small enough number of errors that the errors can be corrected are replaced by valid symbols, and invalid symbols containing too many errors to be corrected by the inner ECC are blanked and converted to erasures. Valid symbols may then be converted to corresponding data according to the inner ECC. In block 1208, data bits derived from the valid symbols and bits from the erasures are de-interleaved into symbols to be applied as input to the outer ECC. In block 1210, the outer ECC is used to detect and correct invalid symbols, such at those containing erasures, to arrive at a set of valid symbols. In block 1212, the data corresponding to the valid symbols of the outer ECC is determined and output, and the process 1200 ends.

It should be appreciated that process 1200 of FIG. 12 is only one example of the types of processes that may be implemented to select a concatenated code based on memory conditions in a channel. In some implementations, such as the implementation of FIG. 12, selecting an ECC may comprise selecting sizes of inner/outer ECCs and/or types of inner/outer ECCs may be selected based on memory in a channel. In alternative implementations, selecting an ECC may comprise selecting a type of an interleaving process may be additionally or alternatively be selected based on memory conditions in a channel. The interleaving process shown in FIG. 11 is only one example of a type of interleaving that may be carried out by embodiments of the invention. In other embodiments, an interleaver may be selected that interleaves and de-interleaves symbols between the inner and outer ECCs in any suitable manner. For example, in some implementations the outer ECC may be chosen to correct random errors, and an interleaver may be selected that randomly (or pseudo-randomly) spreads the bits of an erasure output by the inner ECC throughout the input to the outer ECC. An interleaver may be adapted in any suitable manner to the conditions in the channel.

Techniques operating according to some or all of the embodiments described herein may be implemented in any suitable manner. For example, in some embodiments, the techniques may be implemented as computer-executable instructions encoded on one or more computer-readable storage media such as magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. The computer-readable storage media may be implemented as computer-readable storage media 1306 of FIG. 13 (i.e., as a portion of a computing device 1300) or as a separate computer storage medium. It should be appreciated that, as used herein, a "computer-readable medium," including "computer-readable storage medium," refers to tangible storage media having at least one physical property that may be altered in some way during a process of recording data thereon. For example, a magnetization state of a portion of a physical structure of a computer-readable medium may be altered during a recording process.

In some such embodiments, the computer-executable instructions implementing the techniques operating in accordance with the principles described herein may be implemented as one or more stand-alone functional facilities (e.g., the replication facility described above. As described above, a "functional facility" is a structural component of a system which performs a specific operational role, however instantiated, which may be a portion of or an entire software element (e.g., a function or a discrete process). Generally, functional facilities include routines, programs, objects, components, data structures, etc. that perform particular tasks or implement particular abstract data types. Typically the functionality of the functional facilities may be combined or distributed as desired in various embodiments. These functional facilities may, in some implementations, be adapted to interact with other, unrelated functional facilities and/or processes, such as functional facilities implementing a software program application or implementing an operating system for a computing device, or, in other implementations, the modules may be adapted to interact with other functional facilities which, together with the modules, form an overall system such as an operating system, including the Windows operating system, available from the Microsoft Corporation of Redmond, Wash. In other words, in some implementations, the functional facilities may be implemented alternatively as a portion of or outside of an operating system. It should also be appreciated that, in some implementations, some functional facilities may be implemented separately from others, or some functional facilities may not be implemented.

In some, but not all implementations, the techniques may be embodied as computer-executable instructions that may be executed on any suitable computing device(s) operating in any suitable computer system, including the exemplary computer system of FIG. 1. These computer-executable instructions may be implemented in any suitable manner, including as a number of functional facilities, each providing one or more operations needed to complete execution of such techniques. Each functional facility may be implemented in its own way; all need not be implemented the same way. As used herein, a functional facility is a structural component of a system that performs an operational role. The operational role may be a portion of or an entire software element. For example, a functional facility may perform a function of a process, a discrete process, or any other suitable unit of processing. A functional facility may comprise computer-executable instructions, and, as discussed further below, may be encoded on one or more computer-readable storage media. Additionally, such computer-executable instructions may be written using any of a number of suitable programming languages and/or programming or scripting tools, and also may be compiled as executable machine language code or intermediate code that is executed on a framework or virtual machine. Functional facilities may be executed in parallel or serially, as appropriate, and may pass information between one another using a shared memory on the computer on which they are executing, using a message passing protocol or in any other suitable way.

Exemplary functional facilities are described herein for carrying out one or more tasks, though it should be appreciated that the functional facilities and division of tasks described is merely illustrative of the type of functional facilities that may implement the exemplary techniques described herein, and that the invention is not limited to being implemented in any specific number, division, or type of functional facilities. In some implementations, all functionality may be implemented in a single functional facility.

These functional facilities may operate on a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more application-specifics integrated circuits (ASICs) for carrying out the techniques described herein, one or more Field-Programmable Gate Arrays (FPGAs) for carrying out the techniques described herein, or any other suitable system.

Figure 13:
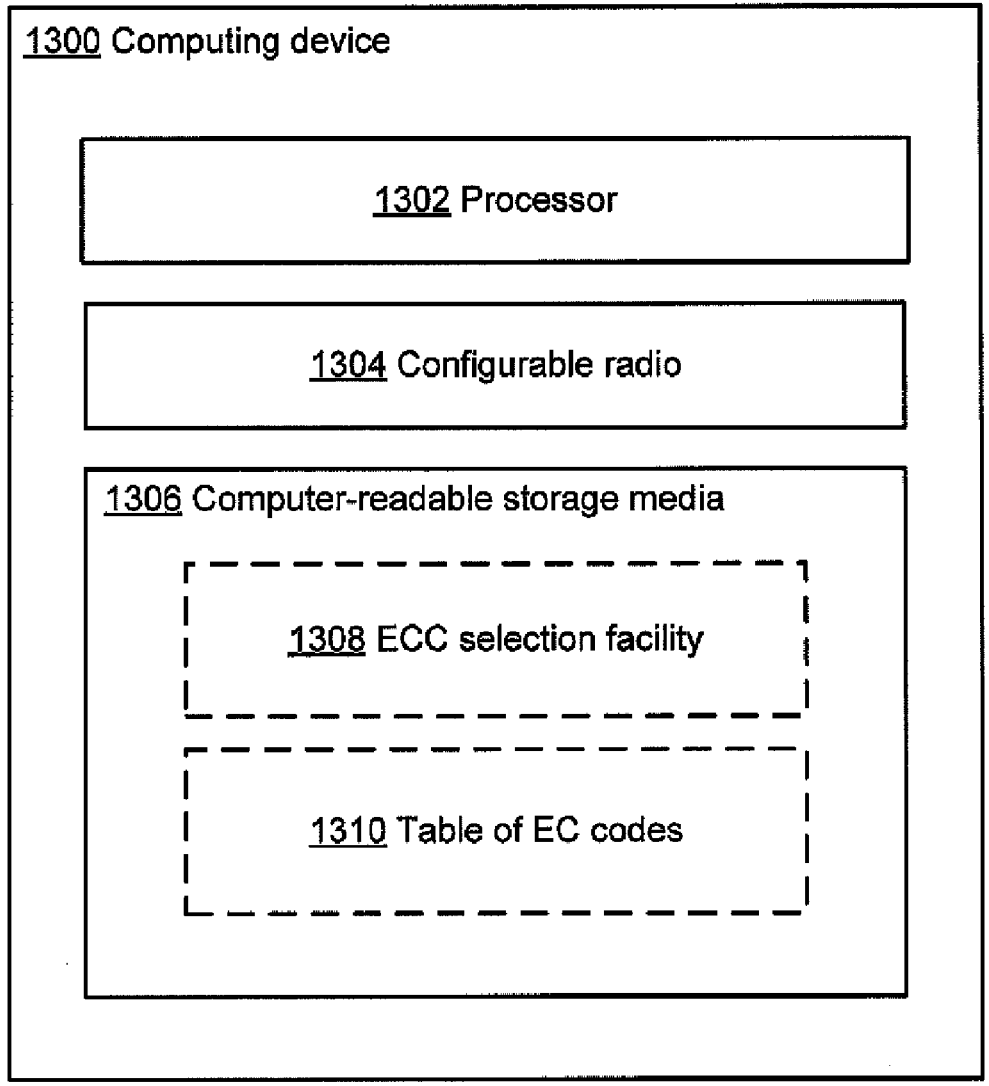
FIG. 13 is a block diagram of one exemplary computing device that may adjust an ECC based on memory in a channel, in accordance with some of the principles described herein.

FIG. 13 illustrates one exemplary implementation of a personal computing device in the form of a computing device 1300 that may be used in a system implementing the techniques described herein, although others are possible. It should be appreciated that FIG. 13 is intended neither to be a depiction of necessary components for a computing device to operate in accordance with the principles described herein, nor a comprehensive depiction.

Computing device 1300 may be implemented as a transmitter and/or receiver in a wireless communication system. As discussed above, a personal computing device may be implemented in any suitable wireless communication system, including a WLAN, WPAN, WWAN, or WRAN, among others.

Computing device 1300 may comprise at least one processor 1302, a configurable radio 1304, and computer-readable storage media 1306. Computing device 1300 may be, for example, a desktop or laptop personal computer, a personal digital assistant (PDA), a smart mobile phone, a server, a wireless access point or other networking element, or any other suitable computing device. Configurable radio 1304 may be any suitable hardware and/or software to enable the computing device 1300 to communicate wirelessly with any other suitable computing device over any suitable computing network. The computing network may include a wireless access point as well as any suitable wired and/or wireless communication medium or media for exchanging data between two or more computers, including the Internet. An example of a configurable radio is described in greater detail above in connection with FIGS. 2 and 8. Computer-readable media 1306 may be adapted to store data to be processed and/or instructions to be executed by processor 1302. Processor 1302 enables processing of data and execution of instructions. The data and instructions may be stored on the computer-readable storage media 1306 and may, for example, enable communication between components of the computing device 1300.

The data and instructions stored on computer-readable storage media 306 may comprise computer-executable instructions implementing techniques which operate according to the principles described herein. In the example of FIG. 13, computer-readable storage media 1306 stores computer-executable instructions implementing various facilities and storing various information as described above. Computer-readable storage media 1306 may store an ECC selection facility 1308 to carry out an ECC selection process in accordance with the principles described herein and in accordance with any of the exemplary techniques described above. The computer-readable storage media 1306 may further comprise a table of error control codes 1310 that may comprise any suitable codes stored and/or sorted in any suitable manner. In some implementations, the codes of the table 1310 may include random-error-correcting (REC) codes and/or burst-error-correcting (BEC) codes, which may be selected individually or in pairs to form concatenated codes.

Having thus described several aspects of at least one embodiment of this invention, it is to be appreciated that various alterations, modifications, and improvements will readily occur to those skilled in the art.

For example, though two codes are shown for the concatenated code in FIG. 8, any number of codes may be concatenated.

Such alterations, modifications, and improvements are intended to be part of this disclosure, and are intended to be within the spirit and scope of the invention. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method of operating a radio to communicate in a channel, the method comprising:
    sensing at least one characteristic of the channel and deriving at least one parameter indicative of memory in the channel, the at least one parameter indicative of memory identifying a likelihood that, if there is an error in a signal received via the channel, the signal will include another error;
    selecting at least one error control code based on the at least one parameter; and
    configuring the radio to operate according to the at least one selected error control code.

2. The method of claim 1, wherein:
    deriving the at least one parameter comprises deriving a parameter indicating a probability that, when the channel is in a fade, it will remain in a fade.

3. The method of claim 1, wherein:
    configuring the radio comprises configuring a radio that transmits symbols in successive intervals; and
    deriving the at least one parameter comprises deriving a parameter indicating a probability that, when a communicated signal power is below a threshold in a first interval, the communicated signal power will be below the threshold in a successive interval.

4. The method of claim 1, wherein the selecting at least one error control code comprises selecting a Golay code when the parameter indicates that the channel has memory below a threshold.

5. The method of claim 1, wherein the selecting at least one error control code comprises selecting an interleaver for a concatenated error control code based on conditions in the channel.

6. The method of claim 1, wherein selecting the at least one selected error control code comprises selecting an inner error control code and an outer error control code, the inner error control code mapping each symbol in a symbol space to either an element of a set of valid symbols or an erasure.

7. The method of claim 6, wherein selecting the at least one selected error control code comprises selecting the inner error control code and the outer error control code to provide a desired overall information rate.

8. The method of claim 6, wherein the inner error control code is one that detects errors in a channel having memory and the outer error control code is one that corrects errors in a channel having memory.

9. The method of claim 6, further comprising:
    receiving a signal encoded with data, the signal comprising a first symbol and at least one second symbol;
    detecting at least one error in the first symbol using the inner error control code;
    voiding the first symbol to provide an erasure;
    providing the erasure and the at least one second symbol to the outer error control code; and
    outputting the data from the outer error control code based on the erasure and the at least one second symbol.

10. The method of claim 1, wherein configuring the radio comprises configuring a radio that is a component of a personal computing device communicating over a wireless regional area network (WRAN).

11. At least one computer-readable storage medium having encoded thereon computer-executable instructions that, when executed by at least one processor, causes the at least one processor to carry out a method of operating a radio to communicate in a channel, the method comprising:
    determining at least one parameter indicative of memory in the channel, the at least one parameter indicative of memory identifying a probability that, when the channel is in a fade, it will remain in a fade;
    selecting at least one error control code based on the at least one parameter; and
    configuring the radio to operate according to the at least one error control code.

12. The at least one computer-readable storage medium of claim 11, wherein:
    selecting the at least one selected error control code comprises selecting an inner error control code and an outer error control code, the inner error control code and the outer error control code being selected to provide a desired overall information rate, and the inner error control code is one that maps a received symbol to an erasure when the received symbol is detected as having more errors than can be corrected based on the error control rate of the inner error control code and outputs corresponding data when the received symbol is detected as having a number of errors that can be corrected based on the error control rate of the inner error control code.

13. The at least one computer-readable storage medium of claim 12, wherein the method further comprises preparing a signal for transmission, the preparing comprising:
   encoding data for the signal using the inner error control code to yield first encoded symbols,
   interleaving the encoded symbols to form interleaved symbols, the bits from the first encoded symbols being distributed over the interleaved symbols, and
   encoding the interleaved symbols using the outer error control code to yield second encoded symbols.

14. The at least one computer-readable storage medium of claim 12, wherein the method further comprises:
   subsequent to the configuring, sensing the at least one parameter indicative of memory in the channel; and
   re-selecting the outer error control code with a larger or smaller error control rate based on a change in the at least one parameter.

15. The at least one computer-readable storage medium of claim 11, wherein selecting the at least one error control code comprises selecting a first error control code having a first error control rate and a second error control code having a second error control rate to have, when the first error control code and the second error control code are applied sequentially to data of a signal to be transmitted, a combined error control rate that meets a desired error control rate.

16. An apparatus comprising:
   a radio; and
   at least one processor programmed to operate the radio to communicate in a channel at least in part by:
      sensing at least one characteristic of the channel and deriving at least one parameter indicative of memory in the channel, the at least one parameter indicative of memory indicating a probability that, when a signal received via the channel includes a plurality of errors, the plurality of errors will occur in the signal in a cluster;
      selecting at least one error control code based on the at least one parameter; and
      configuring the radio to operate according to the at least one error control code.

17. The apparatus of claim 16, wherein:
   the radio comprises an error control coder comprising a plurality of error control stages that can be applied sequentially to encode a signal, and
   wherein the at least one processor is programmed to configure the radio at least in part by configuring the radio with the at least one error control code, wherein, following the configuring, each of the plurality of error control stages applies an error control code of the at least one error control code.

18. The apparatus of claim 17, wherein the at least one processor is programmed to select the at least one error control code at least in part by selecting a first error control code and a second error control code that, when applied together, provide an error control rate less than a threshold.

19. The apparatus of claim 18, wherein:
   selecting the first error control code and the second error control code comprises selecting an inner control code and an outer control code, the inner error control code and the outer error control code being selected to provide a desired overall information rate, and
   the inner error control code is one that maps a received symbol to an erasure when the received symbol is detected as having more errors than can be corrected based on the error control rate of the inner error control code and outputs corresponding data when the received symbol is detected as having a number of errors that can be corrected based on the error control rate of the inner error control code.

* * * * *